United States Patent
Lee et al.

(10) Patent No.: US 9,288,883 B2
(45) Date of Patent: Mar. 15, 2016

(54) BACKLIGHT UNIT AND A DISPLAY APPARATUS HAVING THE SAME

(71) Applicant: SAMSUNG DISPLAY CO., LTD., Gyeonggi-do (KR)

(72) Inventors: Woojin Lee, Chungcheongnam-do (KR); Songyi Han, Chungcheongnam-do (KR); SeungYoung Choi, Gyeonggi-do (KR)

(73) Assignee: SAMSUNG DISPLAY CO., LTD., Yonging, Gyeonggi-Do (KR)

( * ) Notice: Subject to any disclaimer, the term of this patent is extended or adjusted under 35 U.S.C. 154(b) by 164 days.

(21) Appl. No.: 13/734,400

(22) Filed: Jan. 4, 2013

(65) Prior Publication Data

US 2014/0055439 A1 Feb. 27, 2014

(30) Foreign Application Priority Data

Aug. 21, 2012 (KR) .......................... 10-2012-0091489

(51) Int. Cl.
| | |
|---|---|
| H05B 33/08 | (2006.01) |
| H05B 37/03 | (2006.01) |
| G06F 3/038 | (2013.01) |

(52) U.S. Cl.
CPC .............. *H05B 37/036* (2013.01); *G06F 3/038* (2013.01); *H05B 33/0815* (2013.01); *H05B 33/0827* (2013.01)

(58) Field of Classification Search
CPC ................................ H05B 37/03; H05B 37/036
See application file for complete search history.

(56) References Cited

U.S. PATENT DOCUMENTS

| | | | |
|---|---|---|---|
| 6,359,761 B1 * | 3/2002 | Sid .................................... | 361/42 |
| 8,242,716 B2 | 8/2012 | Je et al. | |
| 2007/0216322 A1 | 9/2007 | Kim | |
| 2008/0174544 A1 | 7/2008 | Ueda et al. | |
| 2010/0315005 A1 | 12/2010 | Lin et al. | |
| 2010/0327760 A1 | 12/2010 | Choi et al. | |
| 2011/0043114 A1 * | 2/2011 | Hsu ..................... | H05B 33/0815 315/119 |
| 2011/0062872 A1 * | 3/2011 | Jin ..................... | H05B 33/0818 315/122 |
| 2011/0181625 A1 * | 7/2011 | Shin et al. ....................... | 345/690 |
| 2012/0068714 A1 * | 3/2012 | Wang et al. ..................... | 324/414 |
| 2012/0206433 A1 * | 8/2012 | Suzuki et al. .................. | 345/212 |
| 2012/0293082 A1 * | 11/2012 | Huang et al. .................... | 315/192 |
| 2013/0140990 A1 * | 6/2013 | Campos et al. ............... | 315/120 |

FOREIGN PATENT DOCUMENTS

| | | |
|---|---|---|
| KR | 1020070010613 | 1/2007 |
| KR | 1020080015322 | 2/2008 |

(Continued)

*Primary Examiner* — Dwayne Bost
*Assistant Examiner* — Christopher Kohlman
(74) *Attorney, Agent, or Firm* — F. Chau & Associates, LLC (57) ABSTRACT

A backlight unit includes a power converter which generates a light driving voltage in response to a voltage control signal with a first level, a plurality of light emitting strings, wherein each of the light emitting strings receives the light driving voltage through a first end thereof, and a controller which generates the voltage control signal. The controller is connected to a second end of at least one of the light emitting strings and detects a level of a signal at the connected second end to detect an operation state of the light emitting strings. The controller generates the voltage control signal with a second level to stop the power converter from generating the light driving voltage when the operation state of the light emitting strings is in an abnormal state.

17 Claims, 7 Drawing Sheets

(56) References Cited

FOREIGN PATENT DOCUMENTS

| KR | 1020080050874 | 6/2008 |
| KR | 1020100055629 | 5/2010 |
| KR | 1020100117946 | 11/2010 |
| KR | 1020110004584 | 1/2011 |
| KR | 1020110101938 | 9/2011 |
| KR | 1020120017915 | 2/2012 |

\* cited by examiner

BACKLIGHT UNIT AND A DISPLAY APPARATUS HAVING THE SAME

CROSS-REFERENCE TO RELATED APPLICATION

This application claims priority under 35 U.S.C. §119 to Korean Patent Application No. 10-2012-0091489, filed on Aug. 21, 2012, the disclosure of which is incorporated by reference herein in its entirety.

TECHNICAL FIELD

The present invention relates to a backlight unit and a display apparatus having the same.

DISCUSSION OF THE RELATED ART

Flat panel display apparatuses with features such as light weight, slimness, low power consumption, etc. have been widely distributed.

A liquid crystal display, which is an example of a flat panel display apparatus, is not self-emissive, and thus uses a separate light source to display an image. To this end, the liquid crystal display may include a backlight unit including a backlight lamp, to provide light to a liquid crystal display panel.

Recently, a light emitting diode (LED) with features such as low power consumption, slim size, etc. is used by the backlight unit. However, the LED does not always provide uniform brightness and color at all points along the display area, and further high technology is employed to momentarily control current flowing through the LED for the combination of colors, for example.

In addition, the backlight unit may include plural LED strings to generate brightness demanded by the display apparatus. However, if any one of the LED strings is opened, an over-current may flow in the LED strings, thereby damaging the backlight unit, for example.

SUMMARY

An exemplary embodiment of the present invention provides a backlight unit capable of detecting a malfunction of a light source.

An exemplary embodiment of the present invention provides a display apparatus having the backlight unit.

An exemplary embodiment of the present invention provides a backlight unit that includes a power converter that generates a light driving voltage in response to a voltage control signal with a first level, a plurality of light emitting strings, wherein each of the light emitting strings receives the light driving voltage through a first end thereof, and a controller that generates the voltage control signal. The controller is connected to a second end of at least one of the light emitting strings and detects a level of a signal at the connected second end to detect an operation state of the light emitting strings. The controller generates the voltage control signal with a second level to stop the power converter from generating the light driving voltage when the operation state of the light emitting strings is in an abnormal state.

In an exemplary embodiment of the present invention, the controller includes a detection circuit connected to the second end of the one of the light emitting strings to activate a detection signal when the level of the signal at the connected second end is an abnormal level, and the controller generates the voltage control signal with the second level to stop the power converter from generating the light driving voltage when the detection signal is activated.

In an exemplary embodiment of the present invention, the controller includes a detection circuit connected to the second end of the one of the light emitting strings to activate a detection signal when the level of the signal of the connected second end is higher than a first level or lower than a second level, and the controller generates the voltage control signal with the second level to stop the power converter from generating the light driving voltage when the detection signal is activated.

In an exemplary embodiment of the present invention, the detection circuit includes a first comparator that activates a first comparison signal when a voltage at the second end of the one of the light emitting strings is higher than a first reference voltage, a second comparator that activates a second comparison signal when the voltage at the second end of the one of the light emitting strings is lower than a second reference voltage, and a logic circuit that activates the detection signal when at least one of the first comparison signal or the second comparison signal is activated.

In an exemplary embodiment of the present invention, the logic circuit is a logic AND gate that receives the first comparison signal and the second comparison signal to output the detection signal.

In an exemplary embodiment of the present invention, the backlight unit further includes a plurality of resistors each of which is connected to the second end of a corresponding one of the light emitting strings.

In an exemplary embodiment of the present invention, the backlight unit further includes a primary coil connected to the second end of the one of the light emitting strings and a secondary coil connected to the controller and mutually inducted with the primary coil, and the controller generates the voltage control signal in response to a voltage provided from the secondary coil.

In an exemplary embodiment of the present invention, the backlight unit further includes a photo coupler connected to the second end of the one of the light emitting strings to output an open detection signal to the controller, and the controller generates the voltage control signal with the second level to stop the power converter from generating the light driving voltage when the open detection signal indicates the light emitting strings are in the abnormal state.

In an exemplary embodiment of the present invention, the photo coupler includes a light emitting part connected to the second end of the one of the light emitting strings and a light receiving part that changes a voltage level of the open detection signal in accordance with a brightness of light emitted from the light emitting part.

An exemplary embodiment of the present invention provides a display apparatus that includes a display panel that includes a plurality of pixels, a driving circuit that controls the display panel to display an image, and a backlight unit that provides light to the display panel. The backlight unit includes a power converter that generates a light driving voltage in response to a voltage control signal with a first level, a plurality of light emitting strings, wherein each of the light emitting strings receives the light driving voltage through a first end thereof, and a controller that generates the voltage control signal, wherein the controller is connected to a second end of at least one of the light emitting strings and detects a level of a signal at the connected second end to detect an operation state of the light emitting strings. The controller generates the voltage control signal with a second level to stop the power converter from generating the light driving voltage when the operation state of the light emitting strings is in an abnormal state.

In an exemplary embodiment of the present invention, the controller includes a detection circuit connected to the second end of the one of the light emitting strings to activate a detection signal when the level of the signal at the connected second end is an abnormal level, and the controller, generates the voltage control signal with the second level to stop the power converter from generating the light driving voltage when the detection signal is activated.

In an exemplary embodiment of the present invention, the detection circuit includes a first comparator that activates a first comparison signal when a voltage at the second end of the one of the light emitting strings is higher than a first reference voltage, a second comparator that activates a second comparison signal when the voltage at the second end of the one of the light emitting strings is lower than a second reference voltage, and a logic circuit that activates the detection signal when at least one of the first comparison signal or the second comparison signal is activated.

In an exemplary embodiment of the present invention, the logic circuit is a logic AND gate that receives the first comparison signal and the second comparison signal to output the detection signal.

In an exemplary embodiment of the present invention, the backlight unit further includes a plurality of resistors each of which is connected to the second end of a corresponding one of the light emitting strings.

In an exemplary embodiment of the present invention, the backlight unit further includes a primary coil connected to the second end of the one of the light emitting strings and a secondary coil connected to the controller and mutually inducted with the primary coil, and the controller generates the voltage control signal in response to a voltage provided from the secondary coil.

In an exemplary embodiment of the present invention, the backlight unit further includes a photo coupler connected to the second end of the one of the light emitting strings to output an open detection signal to the controller, and the controller generates the voltage control signal with the second level to stop the power converter from generating the light driving voltage when the open detection signal indicates the light emitting strings are in the abnormal state.

In an exemplary embodiment of the present invention, the photo coupler includes a light emitting part connected to the second end of the one of the light emitting strings and a light receiving part that changes a voltage level of the open detection signal in accordance with a brightness of light emitted from the light emitting part.

In an exemplary embodiment of the present invention, the power converter includes a switching device to control the generation of the light driving voltage in response to the voltage control signal.

In an exemplary embodiment of the present invention, the display panel includes a plurality of gate lines, and a plurality of data lines crossing the gate lines, and the plurality of pixels are each connected to a corresponding gate line of the gate lines and a corresponding data line of the data lines, and the driving circuit includes a data driver that drives the data lines, a gate driver that drives the gate lines, and a timing controller that applies an image data signal and a first control signal to the data driver and applies a second control signal to the gate driver in response to an image signal and a control signal provided from an external source.

An exemplary embodiment of the present invention provides a backlight unit including a power converter configured to generate a light driving voltage; a plurality of light emitting strings, the light emitting strings configured to receive the light driving voltage; and a controller connected to the light emitting strings, the controller configured to identify an overcurrent in the light emitting strings and, in response thereto, provide a control signal to the power converter to disable the light driving voltage.

BRIEF DESCRIPTION OF THE DRAWINGS

The above and other features of the present invention will become more apparent by describing in detail exemplary embodiments thereof with reference to the accompanying drawings in which.

DETAILED DESCRIPTION OF EXEMPLARY EMBODIMENTS

Exemplary embodiments of the present invention will be described more fully hereinafter with reference to the accompanying drawings. The present invention may, however, be embodied in different forms and should not be construed as limited to the embodiments set forth herein.

Figure 1:
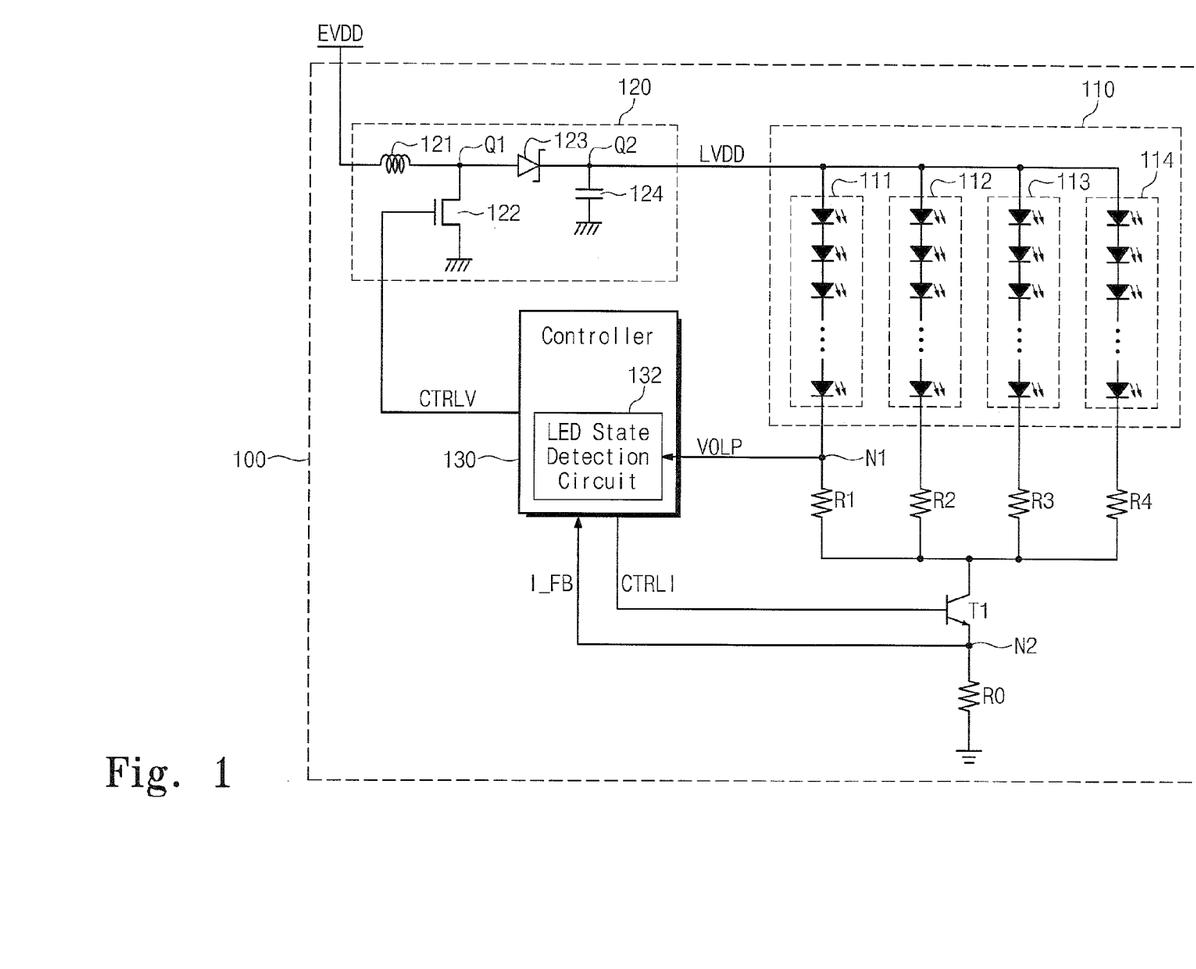
FIG. 1 is a circuit diagram showing a backlight unit according to an exemplary embodiment of the present invention.

FIG. 1 is a circuit diagram showing a backlight unit according to an exemplary embodiment of the present invention.

Referring to FIG. 1, a backlight unit 100 includes a light source 110, a power converter 120, a controller 130, a plurality of resistors R0 to R4, and a transistor T1. The backlight unit 100 may be used as a light source unit for a display panel, e.g., a liquid crystal display panel, which requires a light source. In the present exemplary embodiment, the backlight unit 100 is used as the light source of the display panel, but it may be applied to various electronic products, such as lighting fixtures, advertising panels, etc.

The light source 110 includes a plurality of light emitting diode (LED) strings 111 to 114. In FIG. 1, the light source 110 includes four LED strings 111 to 114, but the number of the LED strings 111 to 114 should not be limited to four. For example, two, six, eight, sixteen or more LED stings may be included.

Each of the LED strings 111 to 114 includes a plurality of LEDs connected to each other in series. The LEDs include a red LED for emitting a red color light, a blue LED for emitting a blue color light, and a green LED for emitting a green color light. The red, blue, and green LEDs have different emitting properties from each other and are applied with different forward driving voltages Vf to emit their light. To reduce power consumption, the LEDs may be operated by a relatively low forward driving voltage Vf. In addition, the forward driving voltage Vf may have a small deviation to maintain uniform brightness. In the present exemplary embodiment, the light source 110 includes the LED strings 111 to 114 each including the LEDs, but the light source 110 may be configured to include, for example, a laser diode or a carbon nano tube, instead of the LEDs.

A first end of each of the LED strings 111 to 114 is connected to the power converter 120 to receive a light driving voltage LVDD. A second end of each of the LED strings 111 to 114 is connected to a first end of a corresponding resistor of the resistors R1 to R4. The transistor T1 includes a first terminal connected to a second end of the resistors R1 to R4, a second terminal connected to a first end of the resistor R0, and a gate terminal controlled by a current control signal CTRLI. A second end of the resistor R0 is connected to a ground voltage.

The power converter 120 converts a source voltage EVDD from an external source (not shown) to the light driving voltage LVDD. The light driving voltage LVDD has a voltage level sufficient to drive the LEDs of the LED strings 111 to 114.

The power converter 120 includes an inductor 121, an NMOS transistor 122, a diode 123, and a capacitor 124. The inductor 121 is connected between the source voltage EVDD and a first node Q1. The NMOS transistor 122 is connected between the first node Q1 and the ground voltage. The NMOS transistor 122 includes a gate terminal applied with a voltage control signal CTRLV from the controller 130. The diode 123 is connected between the first node Q1 and a second node Q2. In the present exemplary embodiment, the diode 123 may be a schottky diode. The capacitor 124 is connected between the second node Q2 and the ground voltage. The light driving voltage LVDD at the second node Q2 is applied to the first end of each of the LED strings 111 to 114.

The power converter 120 converts the source voltage EVDD from the external source to the light driving voltage LVDD. For example, the voltage level of the light driving voltage LVDD may be controlled by the NMOS transistor 122, which is turned on or off in response to the voltage control signal CTRLV applied to the gate terminal of the NMOS transistor 122.

The controller 130 receives a current at a node N2, at which the second terminal of the transistor T1 and the first end of the resistor R0 are connected, as a feedback current signal I_FB and outputs the current control signal CTRLI to the gate terminal of the transistor T1. The controller 130 outputs the current control signal CTRLI in response to the feedback current signal I_FB to control the current flowing through the LED strings 111 to 114. Although not shown in FIG. 1, the controller 130 controls the brightness of the LED strings 111 to 114 in response to a backlight control signal provided from an external source (not shown). In this case, the controller 130 outputs the current control signal CTRLI in response to the backlight control signal.

The transistor T1 is turned on and off in response to the current control signal CTRLI. Since the current flowing through the LED strings 111 to 114 is controlled according to the turning on and off of the transistor T1, the brightness of the LED strings 111 to 114 may be controlled in accordance with the current control signal CTRLI output from the controller 130.

The resistors R1 to R4 are used to compensate for voltage division between the LED strings 111 to 114, which is non-uniform. In other words, the LED string of the LED strings 111 to 114 that requires a high forward driving voltage Vf is connected to a resistor having a relatively low resistance and the LED string of the LED strings 111 to 114 that requires a low forward driving voltage Vf is connected to a resistor having a relatively high resistance. Accordingly, a total power consumed by the LED strings 111 to 114 and the resistors R1 to R4 is uniformly maintained.

The controller 130 includes an LED state detection circuit 132. The LED state detection circuit 132 receives an open detection signal VOLP from the second end of any one of the LED strings 111 to 114. In the present exemplary embodiment, the LED state detection circuit 132 receives a voltage of a node N1 of the LED string 111 as the open detection signal VOLP, but it should not be limited thereto. In other words, the backlight unit 100 may be configured to allow the LED state detection circuit 132 to receive the open detection signal VOLP from any one of the other LED strings 112 to 114. Further, the LED state detection circuit 132 may receive the open detection signal VOLP from each of two or more of the LED strings 111 to 114. The open detection signal VOLP indicates whether the LED strings 111 to 114 are opened or not.

The LED state detection circuit 132 activates a detection signal DET (refer to FIG. 2) to have a first level when the open detection signal VOLP indicates the LED strings 111 to 114 are in an abnormal state. When the detection signal DET is activated to the first level, the controller 130 outputs the voltage control signal CTRLV such that the power converter 120 stops generating the light driving voltage LVDD. For instance, when the voltage control signal CTRLV has a high level, the transistor 122 is turned on. Accordingly, the power converter 120 may not output the light driving voltage LVDD while the transistor 122 is turned on.

Figure 2:
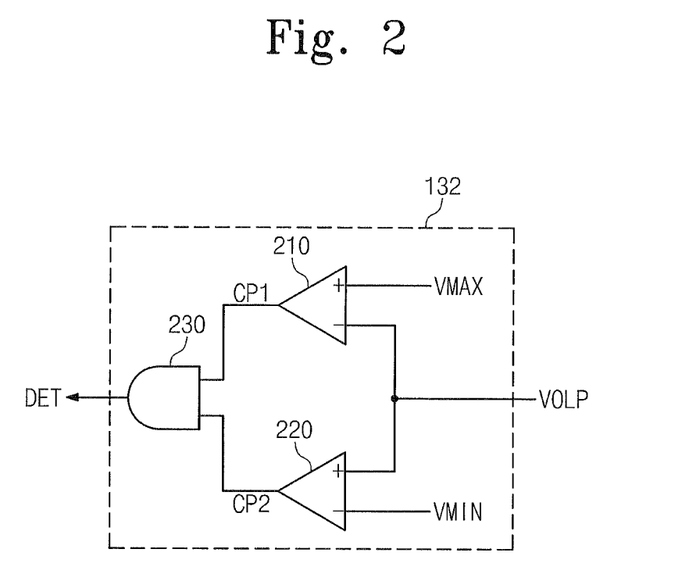
FIG. 2 is a circuit diagram showing a light emitting diode (LED) state detection circuit shown in FIG. 1, according to an exemplary embodiment of the present invention.

FIG. 2 is a circuit diagram showing the LED state detection circuit 132 shown in FIG. 1, according to an exemplary embodiment of the present invention.

Referring to FIG. 2, the LED state detection circuit 132 includes a first comparator 210, a second comparator 220, and a logic circuit 230. The first comparator 210 includes a non-inverting terminal applied with a first reference voltage VMAX, an inverting terminal applied with the open detection signal VOLP, and an output terminal from which a first comparison signal CP1 is output. The first comparator 210 outputs the first comparison signal CP1 at a low level when the voltage level of the open detection signal VOLP is higher than the first reference voltage VMAX.

The second comparator 220 includes a non-inverting terminal applied with the open detection signal VOLP, an inverting terminal applied with a second reference voltage VMIN, and an output terminal from which a second comparison signal CP2 is output. The second comparator 220 outputs the second comparison signal CP2 at the low level when the voltage level of the open detection signal VOLP is lower than the second reference voltage VMIN.

The logic circuit 230 receives the first comparison signal CP1 from the first comparator 210 and the second comparison signal CP2 from the second comparator 220 and outputs the detection signal DET. The logic circuit 230 may be an AND-gate. The logic circuit 230 outputs the detection signal DET at the low level when at least one of the first comparison signal CP1 or the second comparison signal CP2 has the low level. In addition, the logic circuit 230 outputs the detection signal DET at the high level when both of the first comparison signal CP1 and the second comparison signal CP2 have the high level.

Referring to FIG. 1 again, when any one of the LED strings 111 to 114 is opened, an over-current flows through the other LED strings 111 to 114. The LED strings through which the over-current flows may be damaged. The backlight unit 100 may detect whether one or more LED strings of the LED strings 111 to 114 are opened by detecting a variation in the open detection signal VOLP.

Figure 3:
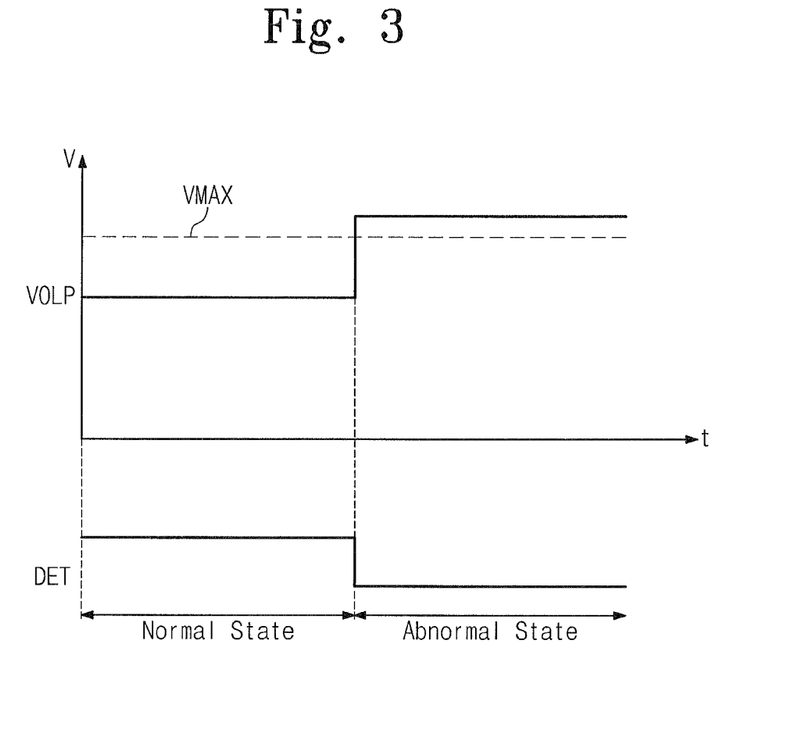
FIG. 3 is a diagram showing an increase of an open detection signal when any one of LED strings shown in FIG. 1 is opened, according to an exemplary embodiment of the present invention.

FIG. 3 is a diagram showing an increase of the open detection signal VOLP when any one of LED strings 111 to 114 is opened, according to an exemplary embodiment of the present invention.

Referring to FIGS. 1 and 3, when any one of the LED strings 112 to 114 except for the LED string 111 connected to the LED state detection circuit 132 is opened, more current flows through the other LED strings except for the opened LED string. Therefore, the voltage at the node N1 of the LED string 111, e.g., the voltage level of the open detection signal VOLP, is increased. The first comparator 210 shown in FIG. 2 outputs the first comparison signal CP1 at the low level when the voltage level of the open detection signal VOLP increases higher than the first reference voltage VMAX. Thus, the detection signal DET output from the logic circuit 230 is transited from the high level to the low level.

When the detection signal DET is activated to the low level, the controller 130 shown in FIG. 1 outputs the voltage control signal CTRLV at the high level to turn on the transistor 122. The light driving voltage LVDD is not output from the power converter 120 while the transistor 122 is turned-on. As described above, in the case that at least one of the LED strings 112 to 114 is opened, the power converter 120 stops generating the light driving voltage LVDD, and thus the backlight unit 100 may be prevented from being damaged by the over-current flowing through the other LED strings.

In FIG. 3, the period in which the voltage level of the open detection signal VOLP is higher than the first reference voltage VMAX is referred to as 'abnormal state' and the period in which the voltage level of the open detection signal VOLP is less than the first reference voltage VMAX is referred to as 'normal state.'

Figure 4:
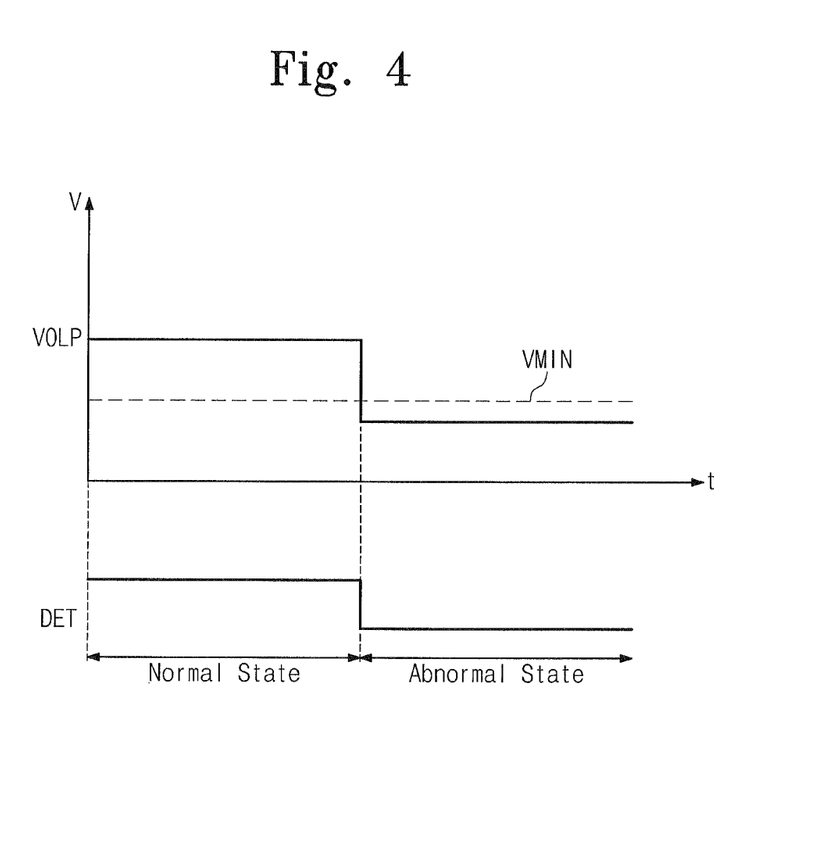
FIG. 4 is a diagram showing a decrease of an open detection signal when any one of LED strings shown in FIG. 1 is opened, according to an exemplary embodiment of the present invention.

FIG. 4 is a diagram showing a decrease of the open detection signal VOLP when any one of LED strings 111 to 114 is opened, according to an exemplary embodiment of the present invention.

Referring to FIGS. 1 and 4, when the LED string 111 connected to the controller 130 is opened, more current flows through the other LED strings 112 to 114. In this case, the voltage at the node N1 of the LED string 111, e.g., the voltage level of the open detection signal VOLP, is decreased. The second comparator 220 shown in FIG. 2 outputs the second comparison signal CP2 at the low level when the voltage level of the open detection signal VOLP decreases lower than the second reference voltage VMIN. Thus, the detection signal DET output from the logic circuit 230 is transited from the high level to the low level.

Accordingly, the detection signal DET is activated to the low level and the controller 130 shown in FIG. 1 outputs the voltage control signal CTRLV at the high level, thereby turning on the transistor 122. The light driving voltage LVDD is not output from the power converter 120 while the transistor 122 is turned-on. As described above, when the LED string 111 is opened, the power converter 120 stops generating the light driving voltage LVDD applied to the LED strings 111 to 114, and thus the backlight unit 100 may be prevented from being damaged by the over-current flowing through the other LED strings 112 to 114.

In FIG. 4, the period in which the voltage level of the open detection signal VOLP is lower than the second reference voltage VMIN is referred to as 'abnormal state' and the period in which the voltage level of the open detection signal VOLP is greater than the second reference voltage VMIN is referred to as 'normal state.'

Figure 5:
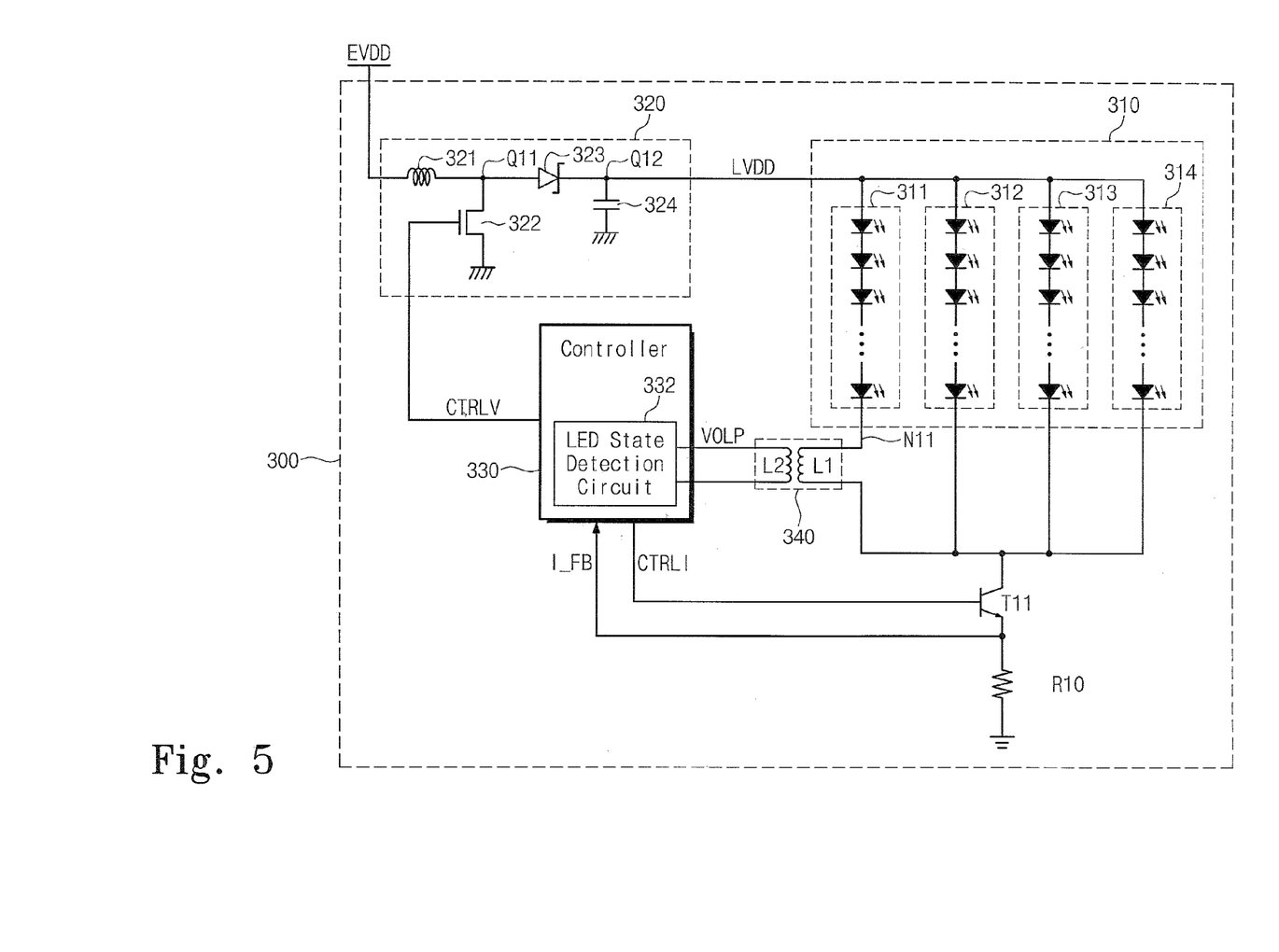
FIG. 5 is a circuit diagram showing a backlight unit according to an exemplary embodiment of the present invention.

FIG. 5 is a circuit diagram showing a backlight unit according to an exemplary embodiment of the present invention.

Referring to FIG. 5, a backlight unit 300 includes a light source 310, a power converter 320, a controller 330, a coil circuit 340, a transistor T11, and a resistor R10. The backlight unit 300 may be used as a light source unit for a display panel, e.g., a liquid crystal display panel, which requires a light source. In the present exemplary embodiment, the backlight unit 300 is used as the light source of the display panel, but it may be applied to various electronic products, such as lighting fixtures, advertising panels, etc.

The light source 310 includes a plurality of LED strings 311 to 314. In FIG. 5, the light source 310 includes four LED strings 311 to 314, but the number of the LED strings 311 to 314 should not be limited to four. For example, two, six, eight, sixteen or more LED stings may be included. A first end of each of the LED strings 311 to 314 is connected to the power converter 320 to receive a light driving voltage LVDD, and a second end of each of the LED strings 311 to 314 is connected to the transistor T11. The coil circuit 340 is connected between the LED string 311 and the controller 330. The coil circuit 340 includes a primary coil L1 and a secondary coil L2. The primary coil L1 is connected between a node N11 to which the second end of the LED string 311 is connected and the transistor T11. Both terminals of the secondary coil L2 are connected to an LED state detection circuit 332 of the controller 330.

When any one of the LED strings 312 to 314 is opened, more current flows through the other LED strings except for the opened LED string. Therefore, a large amount of the current flows through the LED string 311, which is much more than that flowing in a normal state. When the current flowing through the primary coil L1 connected to the node N11 is rapidly changed, an electromotive force is induced in the secondary coil L2 according to electromagnetic induction. In other words, the voltage level of the open detection signal VOLP provided from the secondary coil L2 is increased when any one of the LED strings 312 to 314 is opened.

On the other hand, when the LED string 311 is opened, the amount of current flowing through the LED string 311 is decreased. This causes the amount of current flowing through the primary coil L1 connected to the node N11 to be rapidly decreased, and thus the voltage level of the open detection signal VOLP provided from the secondary coil L2 is decreased.

The controller 330 includes the LED state detection circuit 332. The LED state detection circuit 332 activates the detection signal DET to the first level when the open detection signal VOLP indicates the abnormal state of the LED strings 311 to 314. When the detection signal DET is activated to the first level, the controller 330 outputs the voltage control signal CTRLV to allow the power converter 320 to stop generating the light driving voltage LVDD. For instance, when the voltage control signal CTRLV has the high level, NMOS transistor 322 of the power converter 320 is turned on. The power converter 320 does not output the light driving voltage LVDD while the transistor 332 is turned-on.

As described above, when any one of the LED strings 311 to 314 is opened, the light driving voltage LVDD applied to the LED strings 311 to 314 is blocked, thereby preventing damage to the backlight unit 300.

As shown in FIG. 5, similar to the power converter 120 of FIG. 1, the power converter 320 converts a source voltage EVDD from an external source (not shown) to the light driving voltage LVDD. The light driving voltage LVDD has a voltage level sufficient to drive the LEDs of the LED strings 311 to 314.

The power converter 320 includes an inductor 321, the NMOS transistor 322, a diode 323, and a capacitor 324. The inductor 321 is connected between the source voltage EVDD and a first node Q11. The NMOS transistor 322 is connected between the first node Q11 and a ground voltage. The NMOS transistor 322 includes a gate terminal applied with the voltage control signal CTRLV from the controller 330. The diode 323 is connected between the first node Q11 and a second node Q12. In the present exemplary embodiment, the diode 323 may be a schottky diode. The capacitor 324 is connected between the second node Q12 and the ground voltage. The light driving voltage LVDD at the second node Q12 is applied to the first end of each of the LED strings 311 to 314.

In the present exemplary embodiment, the light source 310 includes the LED strings 311 to 314 each including the LEDs, but the light source 310 may be configured to include, for example, a laser diode or a carbon nano tube, instead of the LEDs.

Figure 6:
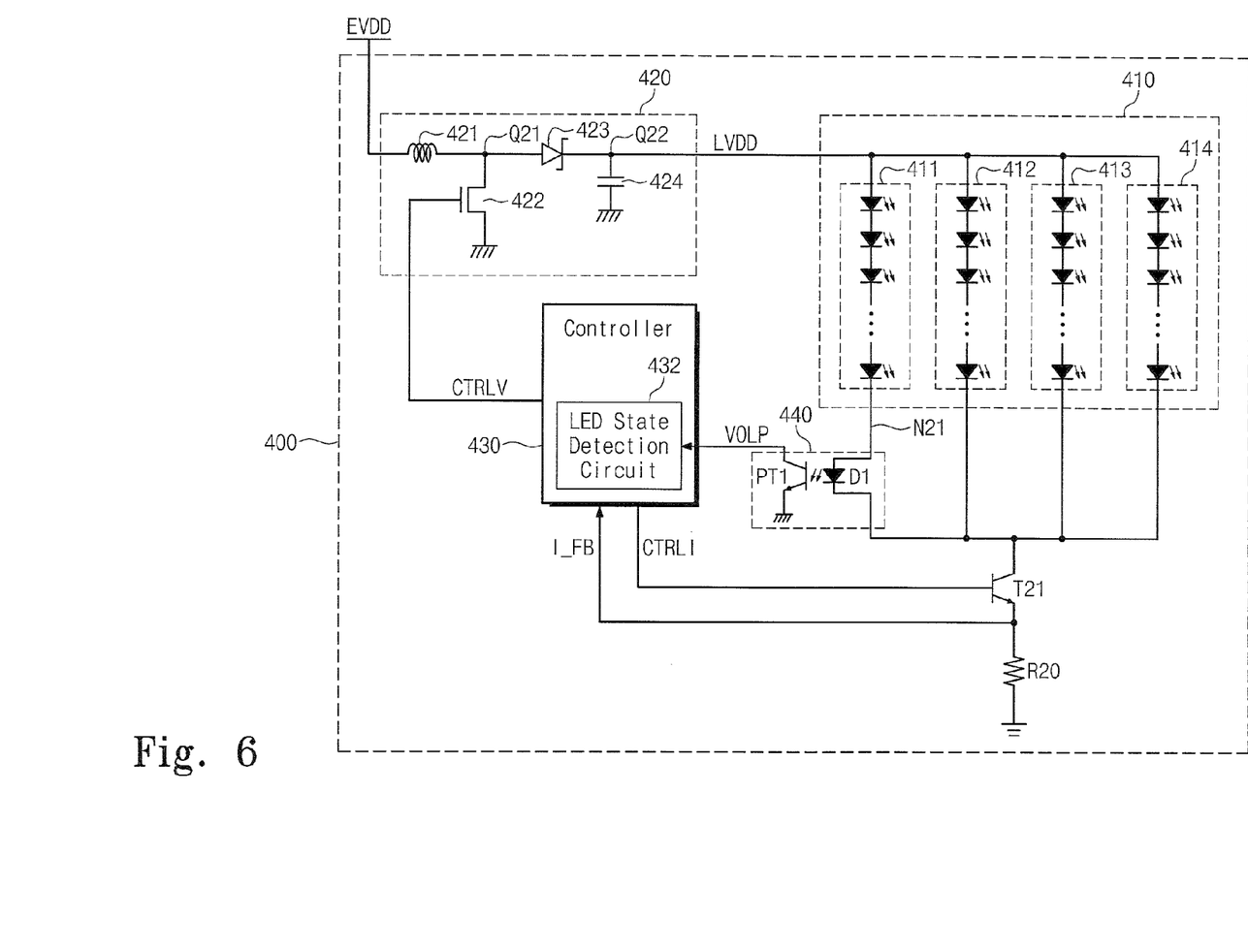
FIG. 6 is a circuit diagram showing a backlight unit according to an exemplary embodiment of the present invention.

FIG. 6 is a circuit diagram showing a backlight unit according to an exemplary embodiment of the present invention.

Referring to FIG. 6, a backlight unit 400 includes a light source 410, a power converter 420, a controller 430, a photo coupler 440, a transistor T21, and a resistor R20. The backlight unit 400 may be used as a light source unit for a display panel, e.g., a liquid crystal display panel, which requires a light source. In the present exemplary embodiment, the backlight unit 400 is used as the light source of the display panel, but it may be applied to various electronic products, such as lighting fixtures, advertising panels, etc.

The light source 410 includes a plurality of LED strings 411 to 414. In FIG. 6, the light source 410 includes four LED strings 411 to 414, but the number of the LED strings 411 to 414 should not be limited to four. For example, two, six, eight, sixteen or more LED stings may be included. A first end of each of the LED strings 411 to 414 is connected to the power converter 420 to receive a light driving voltage LVDD, and a second end of each of the LED strings 411 to 414 is connected to the transistor T21. The photo coupler 440 is connected between the LED string 411 and the controller 430.

The photo coupler 440 includes an LED D1 from which light is emitted and a photo transistor PT1 to which the emitted light is provided. The LED D1 may be a GaAs infrared LED or a GaAlAs infrared LED. The photo transistor PT1 may be a silicon photo transistor, a photo darlington, or a photo triac. The LED D1 is connected between the second end of the LED string 411 at a node N21 and the transistor T21 and the photo transistor PT1 is connected between the controller 430 and a ground voltage.

The LED D1 emits light in accordance with an amount of current flowing through the LED string 411, and current flows through the photo transistor PT1 according to the amount of current received at the LED D1. Although not shown in FIG. 6, an LED state detection circuit 432 includes a resistor (not shown) connected to a collector terminal of the photo transistor PT1. The LED state detection circuit 432 receives a voltage at the collector terminal as the open detection signal VOLP.

When any one of the LED strings 412 to 414 is opened, more current flows through the other LED strings except for the opened LED string. Therefore, a large amount of current flows through the LED string 411, which is much more than that flowing in a normal state. On the other hand, when the LED string 411 is opened, the amount of current flowing through the LED string 411 is decreased. The brightness of light emitted from the LED D1 depends on the amount of current flowing through the LED string 411, and thus the voltage level of the open detection signal VOLP is changed. The LED state detection circuit 432 generates the voltage control signal CTRLV to turn on NMOS transistor 422 when the voltage level of the open detection signal VOLP is deviated from a normal voltage range. Thus, when any one of the LED strings 411 to 414 is opened, the light driving voltage LVDD is not output from the power converter 420, to thereby prevent damage to the backlight unit 400.

As shown in FIG. 6, similar to the power converter 120 of FIG. 1, the power converter 420 converts a source voltage EVDD from an external source (not shown) to the light driving voltage LVDD. The light driving voltage LVDD has a voltage level sufficient to drive the LEDs of the LED strings 411 to 414.

The power converter 420 includes an inductor 421, the NMOS transistor 422, a diode 423, and a capacitor 424. The inductor 421 is connected between the source voltage EVDD and a first node Q221. The NMOS transistor 422 is connected between the first node Q21 and the ground voltage. The NMOS transistor 422 includes a gate terminal applied with the voltage control signal CTRLV from the controller 430. The diode 423 is connected between the first node Q21 and a second node Q22. In the present exemplary embodiment, the diode 423 may be a schottky diode. The capacitor 424 is connected between the second node Q22 and the ground voltage. The light driving voltage LVDD at the second node Q22 is applied to the first end of each of the LED strings 411 to 414.

In the present exemplary embodiment, the light source 410 includes the LED strings 411 to 414 each including the LEDs, but the light source 410 may be configured to include, for example, a laser diode or a carbon nano tube, instead of the LEDs.

Figure 7:
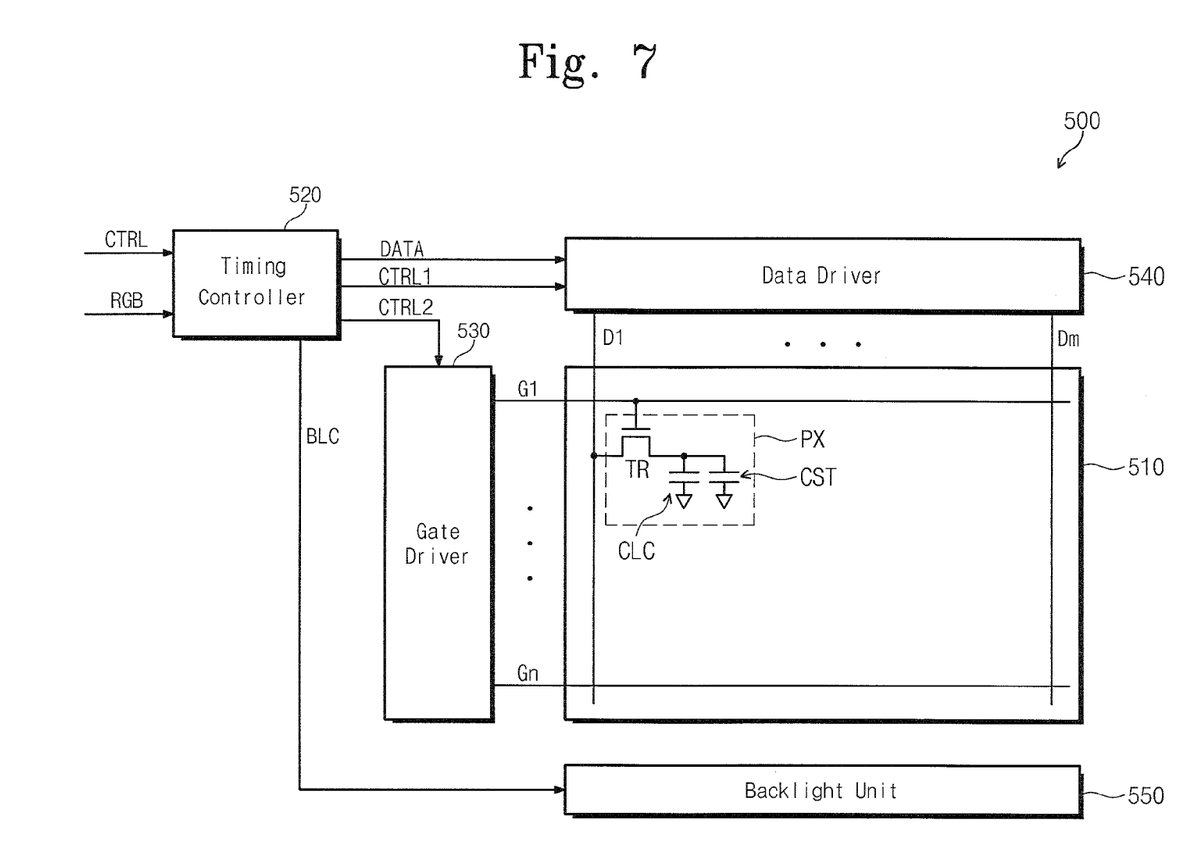
FIG. 7 is a block diagram showing a display apparatus including a backlight unit according to an exemplary embodiment of the present invention.

FIG. 7 is a block diagram showing a display apparatus including a backlight unit according to an exemplary embodiment of the present invention. Hereinafter, a liquid crystal display will be described as the display apparatus. However, the present invention is not limited to the liquid crystal display, and can be applied to any display device that employs a backlight unit.

Referring to FIG. 7, a display apparatus 500 includes a display panel 510, a timing controller 520, a gate driver 530, a data driver 540, and a backlight unit 550.

The display panel 510 includes a plurality of data lines D1 to Dm, a plurality of gate lines G1 to Gn crossing the data lines D1 to Dm, and a plurality of pixels PX arranged in areas defined in association with the data lines D1 to Dm and the gate lines G1 to Gn. The data lines D1 to Dm are insulated from the gate lines G1 to Gn.

Each pixel PX includes a switching transistor TR connected to a corresponding data line of the data lines D1 to Dm and a corresponding gate line of the gate lines G1 to Gn, a liquid crystal capacitor CLC connected to the switching transistor TR, and a storage capacitor CST connected to the switching transistor TR.

The timing controller 520, the gate driver 530, and the data driver 540 serve as driving circuits to allow the display panel 510 to display an image.

The timing controller 520 receives image signals RGB and control signals CTRL, e.g., a vertical synchronization signal, a horizontal synchronization signal, a main clock signal, a data enable signal, etc., which are used to control the image signals RGB provided from an external source (not shown). The timing controller 520 converts the image signals RGB to image data signals DATA appropriate for an operation condition of the display panel 510 on the basis of the control signals CTRL. The timing controller 520 applies the image data signals DATA and a first control signal CTRL1 to the data driver 540 and applies a second control signal CTRL2 to the gate driver 530. The first control signal CTRL1 includes a start pulse signal, a clock signal, a polarity inversion signal, and a line latch signal, and the second control signal CTRL2 includes a vertical synchronization signal, an output enable signal, and a gate pulse signal.

The gate driver 530 drives the gate lines G1 to Gn in response to the second control signal CTRL2 provided from the timing controller 520. The gate driver 530 includes a gate driver IC, but the gate driver 530 should not be limited to the gate driver IC. In other words, the gate driver 530 may be configured in a circuit using oxide semiconductor, amorphous semiconductor, crystalline semiconductor, or polycrystalline semiconductor.

The data driver 540 outputs gray-scale voltages in response to the image data signals DATA and the first control signal CTRL1 provided from the timing controller 520 to drive the data lines D1 to Dm.

When a gate on voltage VON is applied to one of the gate lines G1 to Gn by the gate driver 530, switching transistors arranged in one row and connected to the one gate line are turned on while the gate on voltage VON is applied to the one gate line. In this case, the data driver 540 provides the gray-scale voltages corresponding to the image data signals DATA to the data lines D1 to Dm. The gray-scale voltages applied to the data lines D1 to Dm are applied to corresponding liquid crystal capacitors CLC and corresponding storage capacitors CST through the turned-on switching transistors TR.

The backlight unit 550 provides light to the display panel 510. The display panel 510 receives the light from the backlight unit 550 and displays image information based on the image data signals DATA, for example.

The backlight unit 550 is operated in response to a backlight control signal BLC provided from the timing controller 520. For instance, the backlight unit 550 controls the brightness of the light in response to the backlight control signal BLC provided from the timing controller 520 and the backlight unit 550 is turned on and off in response to the backlight control signal BLC. The backlight unit 550 may be one of backlight units 100, 300, and 400 respectively shown in FIGS. 1, 5, and 6.

When any one of the LED strings included in the backlight unit 550 is opened, the backlight unit 550 included in the display apparatus 500 detects an over-current flowing through the other LED strings and stops generating the light driving voltage LVDD. Accordingly, the backlight unit 550 or the display apparatus 500 may be prevented from being damaged due to the over-current flowing through the LED strings.

Although exemplary embodiments of the present invention have been described, it is understood that the present invention should not be limited to these exemplary embodiments but various changes and modifications can be made by one of ordinary skill in the art within the spirit and scope of the present invention as hereinafter claimed.

What is claimed is:

1. A backlight unit, comprising:
    a power converter which generates a light driving voltage in response to a voltage control signal with a first level;
    a plurality of light emitting strings, wherein each of the light emitting strings receives the light driving voltage through a first end thereof; and
    a controller connected to a second end of only one of the light emitting strings and wherein the controller compares a voltage of a signal at the connected second end with a first reference voltage and a second reference voltage, and generates the voltage control signal,
    wherein the controller comprises a detection circuit that activates a detection signal when the voltage of the signal at the connected second end is higher than the first reference voltage, or lower than the second reference voltage to detect an abnormal state of all of the light emitting strings,
    wherein the first reference voltage is higher than the second reference voltage,
    wherein the controller generates the voltage control signal with a second level to stop the power converter from generating the light driving voltage when the detection signal is activated.

2. The backlight unit of claim 1, wherein the detection circuit comprises:
    a first comparator which activates a first comparison signal when the voltage of the signal at the second end of the one of the light emitting strings is higher than the first reference voltage;
    a second comparator which activates a second comparison signal when the voltage of the signal at the second end of the one of the light emitting strings is lower than the second reference voltage; and
    a logic circuit which activates the detection signal when at least one of the first comparison signal or the second comparison signal is activated.

3. The backlight unit of claim 2, wherein the logic circuit is a logic AND gate which receives the first comparison signal and the second comparison signal to output the detection signal.

4. The backlight unit of claim 2, further comprising a plurality of resistors each of which is connected to the second end of a corresponding one of the light emitting strings.

5. The backlight unit of claim 1, further comprising:
    a primary coil connected to the second end of the one of the light emitting strings; and
    a secondary coil connected to the controller and mutually inducted with the primary coil, wherein the controller generates the voltage control signal in response to a voltage provided from the secondary coil.

6. The backlight unit of claim 1, further comprising a photo coupler connected to the second end of the one of the light emitting strings to output an open detection signal to the controller, wherein the controller generates the voltage control signal with the second level to stop the power converter from generating the light driving voltage when the open detection signal indicates the light emitting strings are in the abnormal state.

7. The backlight unit of claim 6, wherein the photo coupler comprises:
    a light emitting part connected to the second end of the one of the light emitting strings; and
    a light receiving part which changes a voltage level of the open detection signal in accordance with a brightness of light emitted from the light emitting part.

8. A display apparatus, comprising:
    a display panel which includes a plurality of pixels;
    a driving circuit which controls the display panel to display an image; and
    a backlight unit which provides light to the display panel, the backlight unit comprising:
    a power converter which generates a light driving voltage in response to a voltage control signal with a first level;

a plurality of light emitting strings, wherein each of the light emitting strings receives the light driving voltage through a first end thereof; and a controller connected to a second end of only one of the light emitting strings and wherein the controller compares a voltage of a signal at the connected second end with a first reference voltage and a second reference voltage, and generates the voltage control signal, wherein the controller comprises a detection circuit that activates a detection signal when the voltage of the signal at the connected second end is higher than the first reference voltage, or lower than the second reference voltage to detect an abnormal state of all of the light emitting strings, wherein the first reference voltage is higher than the second reference voltage, wherein the controller generates the voltage control signal with a second level to stop the power converter from generating the light driving voltage when the detection signal is activated.

9. The display apparatus of claim 8, wherein the detection circuit comprises:

a first comparator which activates a first comparison signal when the voltage of the signal at the second end of the one of the light emitting strings is higher than the first reference voltage;

a second comparator which activates a second comparison signal when the voltage of the signal at the second end of the one of the light emitting strings is lower than the second reference voltage; and a logic circuit which activates the detection signal when at least one of the first comparison signal or the second comparison signal is activated.

10. The display apparatus of claim 9, wherein the logic circuit is a logic AND gate that receives the first comparison signal and the second comparison signal to output the detection signal.

11. The display apparatus of claim 9, wherein the backlight unit further comprises a plurality of resistors each of which is connected to the second end of a corresponding one of the light emitting strings.

12. The display apparatus of claim 8, wherein the backlight unit further comprises:

a primary coil connected to the second end of the one of the light emitting strings; and a secondary coil connected to the controller and mutually inducted with the primary coil, wherein the controller generates the voltage control signal in response to a voltage provided from the secondary coil.

13. The display apparatus of claim 8, wherein the backlight unit further comprises a photo coupler connected to the second end of the one of the light emitting strings to output an open detection signal to the controller, wherein the controller generates the voltage control signal with the second level to stop the power converter from generating the light driving voltage when the open detection signal indicates the light emitting strings are in the abnormal state.

14. The display apparatus of claim 13, wherein the photo coupler comprises:

a light emitting part connected to the second end of the one of the light emitting strings; and a light receiving part which changes a voltage level of the open detection signal in accordance with a brightness of light emitted from the light emitting part.

15. The display apparatus of claim 8, wherein the power converter comprises a switching device to control the generation of the light driving voltage in response to the voltage control signal.

16. The display apparatus of claim 8, wherein the display panel comprises a plurality of gate lines, and a plurality of data lines crossing the gate lines, and the plurality of pixels are each connected to a corresponding gate line of the gate lines and a corresponding data line of the data lines, and the driving circuit comprises:

a data driver which drives the data lines;

a gate driver which drives the gate lines; and a timing controller which applies an image data signal and a first control signal to the data driver and applies a second control signal to the gate driver in response to an image signal and a control signal provided from an external source.

17. A backlight unit, comprising:

a power converter configured to generate a light driving voltage;

a plurality of light emitting strings, the light emitting strings configured to receive the light driving voltage at a first end thereof; and a controller connected to a second end of only one of the light emitting strings and wherein the controller compares a level of a signal at the connected second end with a first reference level and a second reference level to identify an overcurrent in the light emitting strings and, in response thereto, provide a control signal to the power converter to disable the light driving voltage, wherein the controller comprises a detection circuit that activates a detection signal for detecting an abnormal state of all of the light emitting strings when the level of the signal at the connected second end is higher than the first reference level or lower than the second reference level, and the controller generates the control signal to stop the power converter from generating the light driving voltage when the detection signal is activated, wherein the first reference level is higher than the second reference level.

* * * * *